(12) United States Patent
Cummings

(10) Patent No.: US 7,264,253 B1
(45) Date of Patent: Sep. 4, 2007

(54) TRUCK TAILGATE STEP

(76) Inventor: Robert Cummings, 2820 NE. 44th St., Lighthouse Point, FL (US) 33064

( * ) Notice: Subject to any disclaimer, the term of this patent is extended or adjusted under 35 U.S.C. 154(b) by 215 days.

(21) Appl. No.: 11/064,632

(22) Filed: Feb. 23, 2005

Related U.S. Application Data

(60) Provisional application No. 60/548,528, filed on Feb. 26, 2004.

(51) Int. Cl.
*B60R 3/02* (2006.01)

(52) U.S. Cl. .................... 280/163; 182/127; 296/62

(58) Field of Classification Search ............ 280/163, 280/164.1, 166, 169; 182/88, 127; 296/62; 105/443
See application file for complete search history.

(56) References Cited

U.S. PATENT DOCUMENTS

| | | | | |
|---|---|---|---|---|
| 2,647,677 | A | * | 8/1953 | Reed ..................... 182/88 |
| 3,716,254 | A | * | 2/1973 | Tarvin ................... 280/166 |
| 3,853,369 | A | * | 12/1974 | Holden .................. 296/62 |
| 3,865,399 | A | * | 2/1975 | Way ...................... 280/166 |
| 4,021,071 | A | * | 5/1977 | Norman ................. 296/62 |
| 4,180,143 | A | * | 12/1979 | Clugston ............... 182/91 |
| 4,191,388 | A | | 3/1980 | Barksdale |
| 4,264,084 | A | * | 4/1981 | Telles ................... 280/166 |
| 4,639,032 | A | | 1/1987 | Barbour |
| 4,846,487 | A | * | 7/1989 | Criley ................... 280/166 |
| 4,848,821 | A | * | 7/1989 | Llewellyn .............. 296/62 |
| 5,028,063 | A | | 7/1991 | Andrews |
| 5,205,603 | A | * | 4/1993 | Burdette, Jr. ........... 296/62 |
| 5,228,707 | A | * | 7/1993 | Yoder ................... 280/166 |
| 5,513,866 | A | * | 5/1996 | Sisson ................... 280/166 |
| 5,549,312 | A | * | 8/1996 | Garvert ................. 280/166 |
| 5,617,930 | A | * | 4/1997 | Elia ...................... 182/97 |
| 5,685,594 | A | | 11/1997 | Harper |
| 5,732,996 | A | | 3/1998 | Graffy et al. |
| 5,788,311 | A | | 8/1998 | Tibbals |
| 5,820,193 | A | | 10/1998 | Straffon |
| 5,941,342 | A | * | 8/1999 | Lee ...................... 182/95 |
| 6,116,378 | A | | 9/2000 | Barrow |
| 6,170,842 | B1 | * | 1/2001 | Mueller ................. 280/163 |
| 6,170,843 | B1 | | 1/2001 | Maxwell et al. |
| 6,237,927 | B1 | | 5/2001 | Debo |
| 6,270,139 | B1 | * | 8/2001 | Simpson ................. 296/62 |
| 6,345,691 | B1 | * | 2/2002 | Ruiz ..................... 182/195 |
| 6,364,392 | B1 | | 4/2002 | Meinke |
| 6,422,342 | B1 | | 7/2002 | Armstrong et al. |
| 6,474,668 | B2 | | 11/2002 | Debo |
| 6,685,204 | B1 | * | 2/2004 | Hehr ..................... 280/166 |
| 6,857,680 | B2 | * | 2/2005 | Fielding ................. 296/62 |
| 6,880,843 | B1 | * | 4/2005 | Greer, Jr. ............... 280/166 |
| 6,905,158 | B1 | * | 6/2005 | Bastian .................. 296/62 |

(Continued)

FOREIGN PATENT DOCUMENTS

WO    WO88/03882    *    6/1988

*Primary Examiner*—Christopher Bottorff
(74) *Attorney, Agent, or Firm*—Raggio & Dinnin, P.C.

(57) ABSTRACT

A tailgate step for use on a vehicle. The step includes a guide rail bracket. A sliding member is arranged within the guide rail bracket. A support arm is pivotally connected to an end of the sliding member. A fact plate is secured to the guide rail bracket. The step also includes a stop plate pivotally connected to the support arm and a cover secured to an end of the support arm.

18 Claims, 9 Drawing Sheets

U.S. PATENT DOCUMENTS

| | | |
|---|---|---|
| 6,918,624 B2 * | 7/2005 | Miller et al. .................. 296/62 |
| 2001/0035625 A1 | 11/2001 | Debo |
| 2002/0070577 A1 | 6/2002 | Pool, III et al. |
| 2003/0116938 A1 | 6/2003 | Shields et al. |

* cited by examiner

TRUCK TAILGATE STEP

Continuation of U.S. Provisional Patent Application Ser. No. 60/548,528—Filed: Feb. 26, 2004

TECHNICAL FIELD

The present invention relates generally to parts and accessories for pick-up trucks, and relates more particularly to a folding auxiliary step adapted for installation inside the tailgate of such a vehicle.

BACKGROUND OF THE INVENTION

Pick-up trucks have been, for many years, one of the most economically important vehicles to the United States automotive industry. Consumer uses vary from snow clearing, hauling and off-road use to conventional automobile transmit activities. As with many popular vehicles, various after market accessories have become available. Bed accessories have become increasingly popular as a means for facilitating various uses for pick-up trucks. Consumers are presently offered a wide variety of tonneau covers, bed liners and truck caps for accessorizing their vehicles. In addition, coolers, tool boxes, bed extenders, campers and even specialty hound dog cages are commonly seen on the road.

While the variety, appearance and utility of pick-up truck accessories has increased dramatically over the years, a drawback to the overall vehicle design has been the relatively high positioning of the truck bed relative to the ground. Increasing ruggedness and accessorizing of trucks has created many truck models with the bed positioned at too high a level for an individual to step easily into, and out of. Where a truck user is loading heavy or bulky items into the vehicle, it is often necessary for the user to place his load on the tailgate, step into the bed of the truck, then bend over to pick up his load and position it where desired.

Various auxiliary folding steps have been proposed over the years to assist users in stepping into or out of the bed of their truck. Such devices have met with varying success, in part because they tend to be relatively large and bulky, therefore difficult to use, and can interfere with the ordinary use of the tailgate or truck bed. Moreover, such devices tend to detract from the overall aesthetic appeal of the vehicle.

SUMMARY OF THE INVENTION

In one aspect, the present invention provides an apparatus for a folding retractable auxiliary step for a pick-up truck. The step preferably includes a hinged step plate that folds into a slidable rack system that may or may not be a modular design mount to a vehicle tailgate, mounted both internally and externally.

BRIEF DESCRIPTION OF THE DRAWINGS

The following diagrams (Figures) are viewed from the rear of the vehicle with the tailgate down. The step is extended out in the down position ready for user access. This is identified as "vehicle position". The step apparatus extends out of the side of the tailgate and folds down toward the earth surface.

DETAILED DESCRIPTION OF PREFERRED EMBODIMENTS

Figure 1:
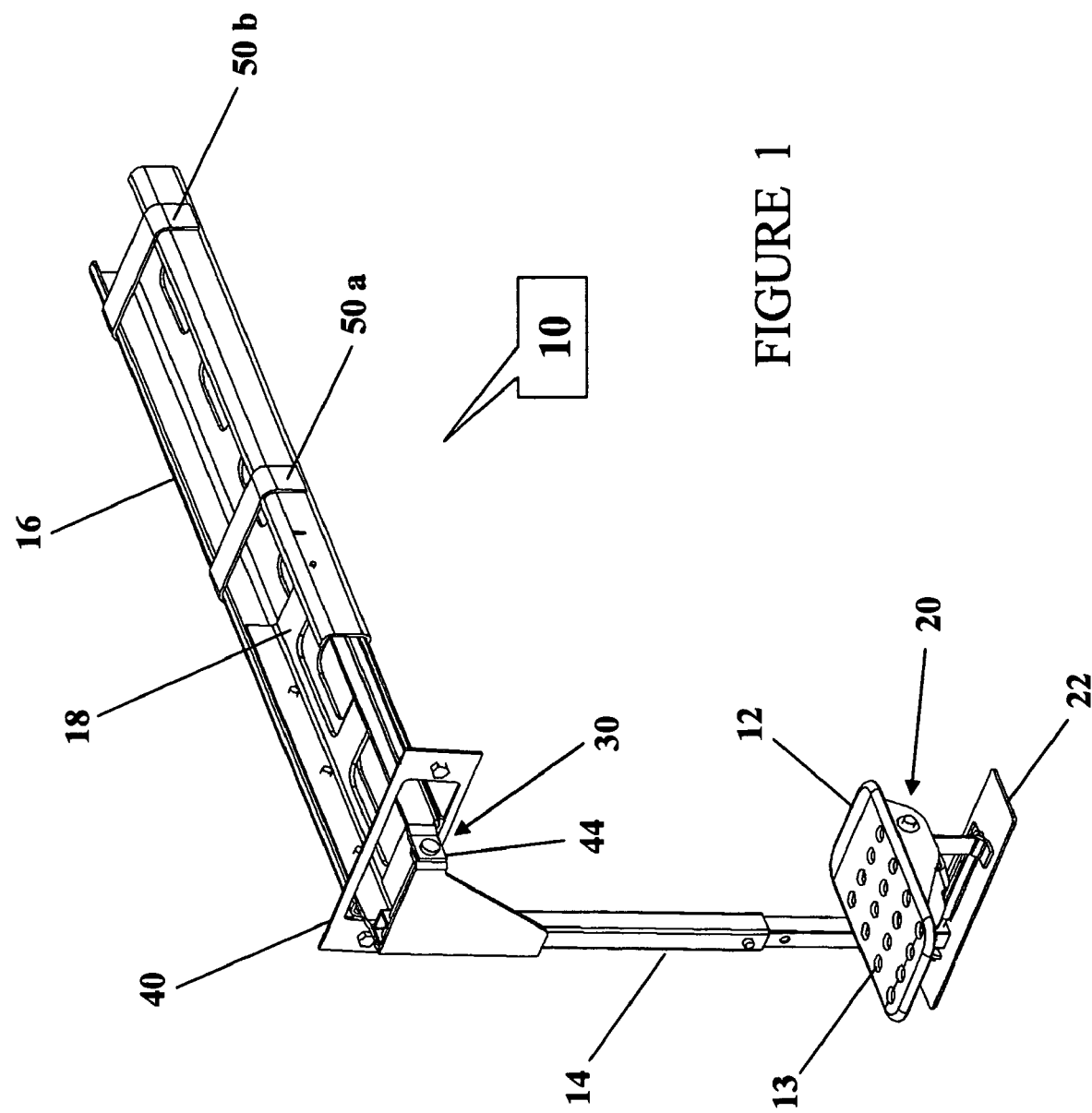
FIG. 1 is a perspective view of a step apparatus in vehicle position (tailgate down) according to a preferred embodiment of the present invention.
Figure 2:
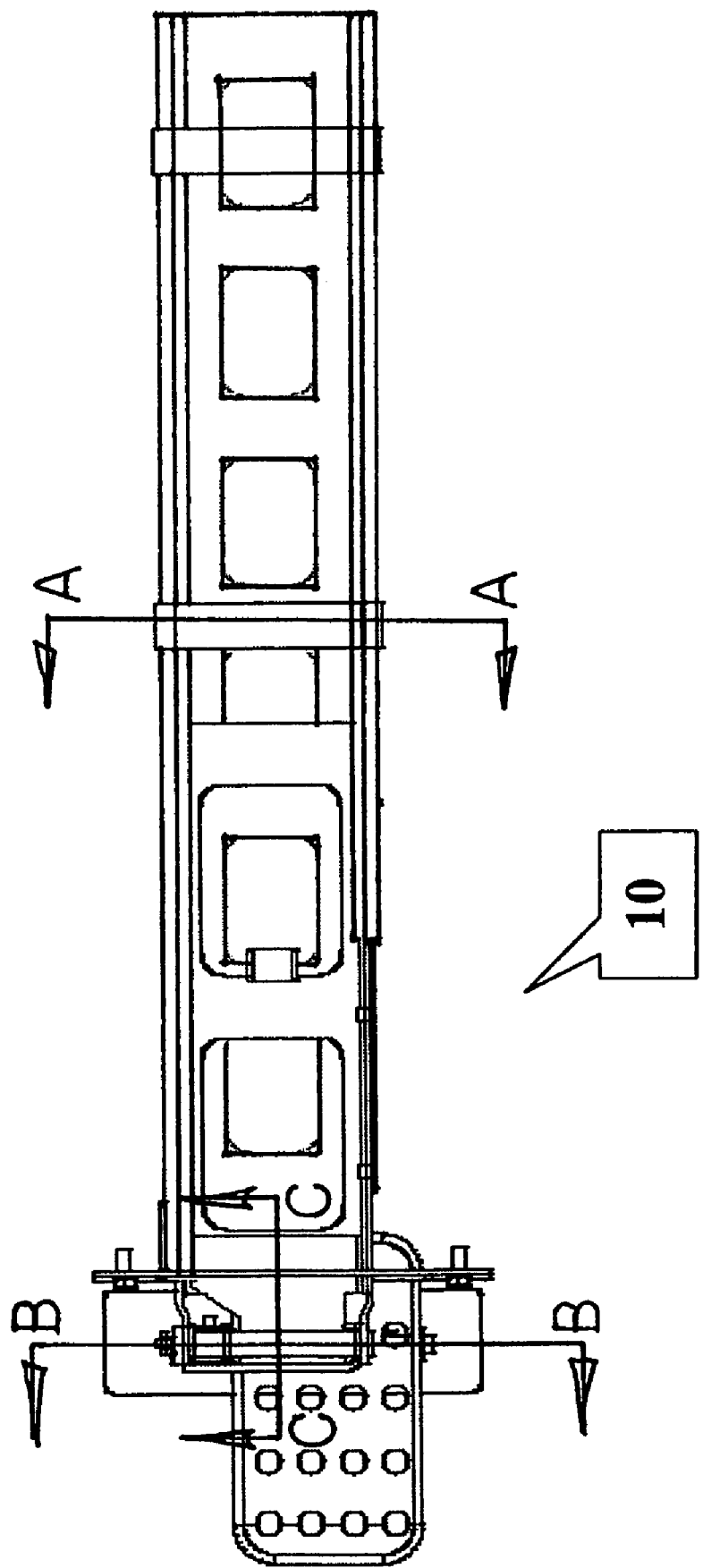
FIG. 2 is a top view of the apparatus of FIG. 1 in vehicle position.
Figure 3:
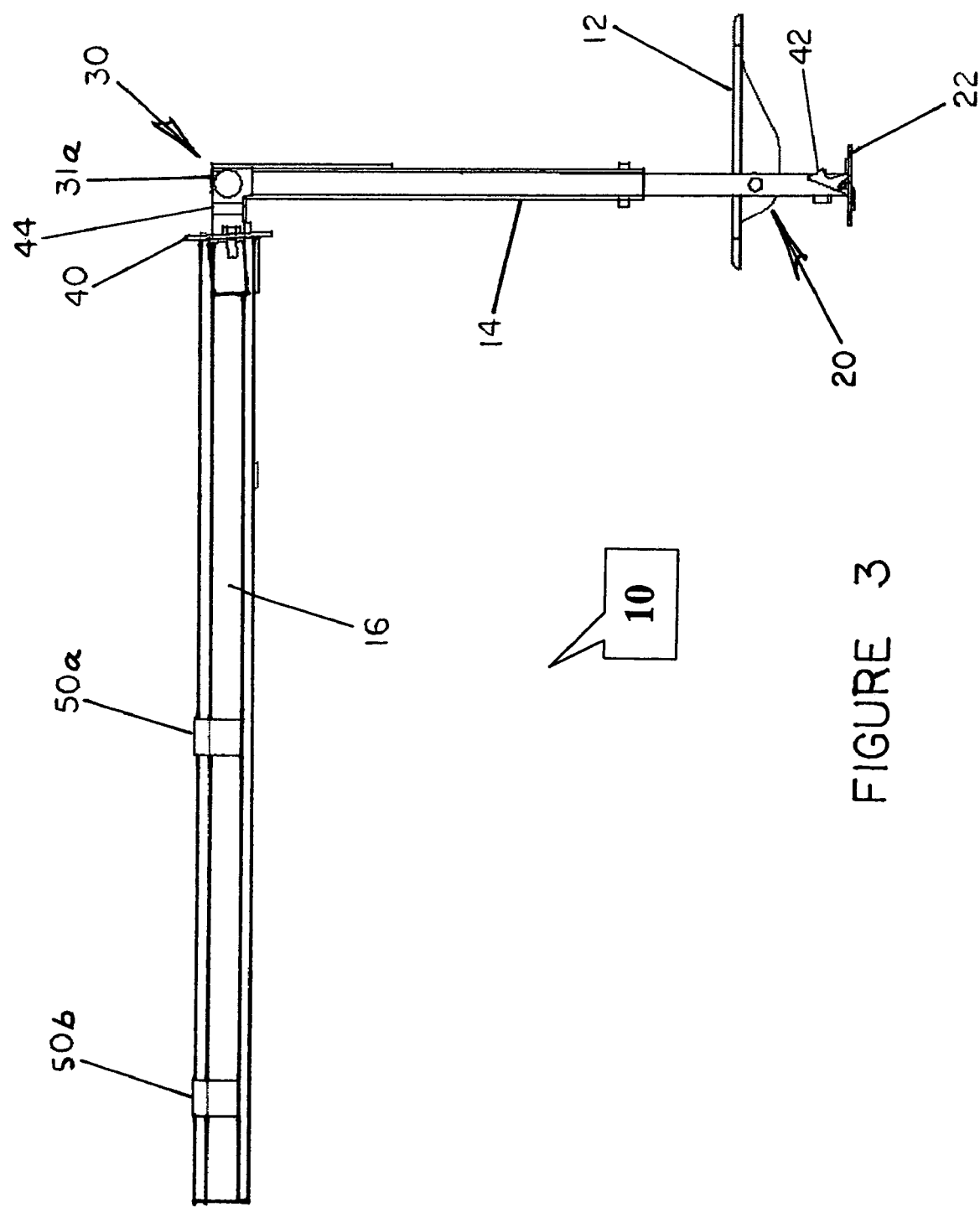
FIG. 3 is a side view of the apparatus of FIGS. 1 and 2 in vehicle position.
Figure 4:
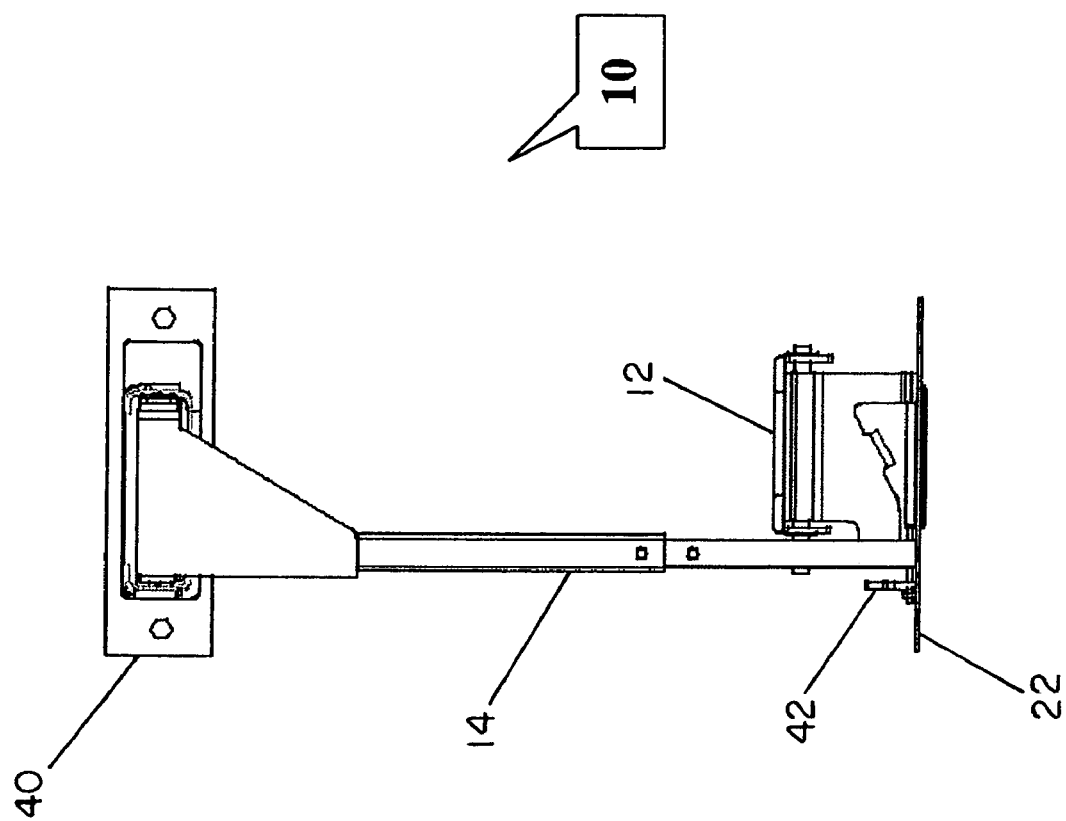
FIG. 4 is a front view of the apparatus of FIGS. 1, 2 and 3 in vehicle position.

Referring to the drawing Figures, the present invention provides a folding retractable step apparatus 10 (FIG. 1) that is mounted internally and partially externally in a vehicle tailgate, and may be withdrawn and unfolded for use as an auxiliary step into the bed of a vehicle. Apparatus 10 preferably includes a step plate 12 that is hingedly attached to an adjustable support arm 14 at a first hinge 20. Support arm 14 adjusts vertically from the vehicle tailgate to step plate 12, which in turn adjusts the distance from the earth or any other to the surface to step plate 12. Support arm 14 is in turn hingedly attached at a second hinge 30 to a sliding member 18, slidable within guide rail bracket 16. The sliding member 18 has a flange 44 extending from an end thereof. The apparatus can thus be folded at the respective hinge points and slid into a stowed position within the tailgate of a vehicle (not shown). A lifting plate or cover 22 is preferably provided, mounted to either step plate 12 or an end of support arm 14, and may be used to pull apparatus 10 from its stored position when desired. Apparatus 10 is mounted within a vehicle tailgate such that lifting plate or cover 22 lies substantially flush with a tailgate top edge when the device is mounted therein, in the stored position. When apparatus 10 is in a stored position, a user can grip beneath an offset portion of cover 22 (preferably elevated slightly from the tailgate top edge) to slide the working parts of the apparatus out of the vehicle tailgate. A main portion of cover 22 preferably extends across the opening within which apparatus 10 is stored, preventing the entry of water, dirt and other debris. The design of lifting plate cover 22 will vary based upon the design of a particular vehicle's tailgate by the auto manufacturer, however, the function and utility will remain the same. The cover 22 may include a lock mechanism 42 for use in securing the step apparatus when in a stored position. The lock 42 interacts with the guide rail bracket 16 or stop plate 40 in the locked position.

Figure 7:
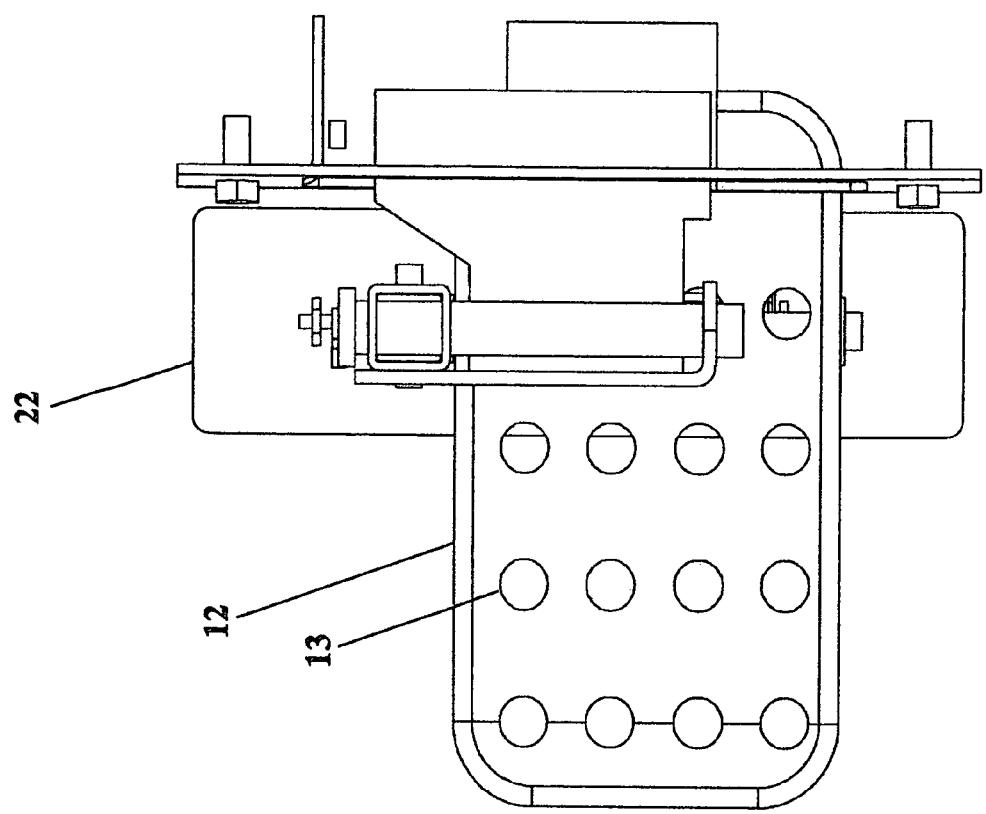
FIG. 7 is a partial elevational view of a step apparatus according to a preferred embodiment of the present invention; with incorporation of a non-skid surface.

In a preferred embodiment, step plate 12, as illustrated in FIG. 7, is a substantially rectangular member having a plurality of textures regions 13, preferably defining apertures that extend through a thickness of plate 12 and assist in providing friction that enhances a user's grip when stepping upon plate 12. Texture 13 regions/apertures may be any suitable type of design or material to allow water, ice and debris to be cleared from the plate and to provide friction during use of the step plate. Variations in the material design of texture 13 shall be within the scope of the present invention. Hinge 20 may be any suitable type of hinge known in the art, but is preferably fashioned such that plate 12 may be folded down only to about 90° relative to support arm 14. In particular, hinge 20 preferably acts as a support member and includes a stop plate that abuts against the underside surface of step plate 12 when step plate 12 is positioned substantially 90° relative to support arm 14.

Figure 5:
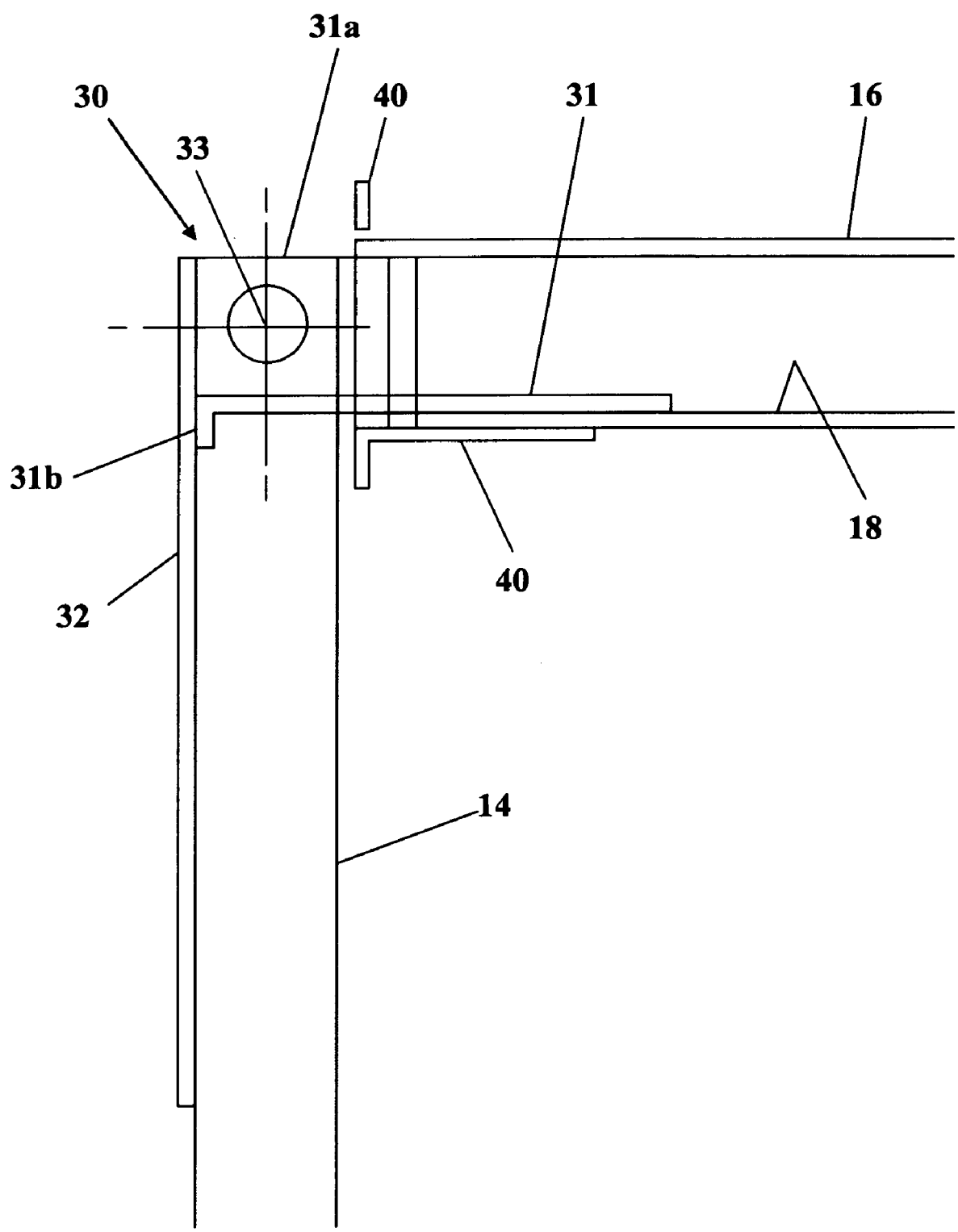
FIG. 5 is a sectioned view taken along line C-C of FIG. 2.
Figure 8:
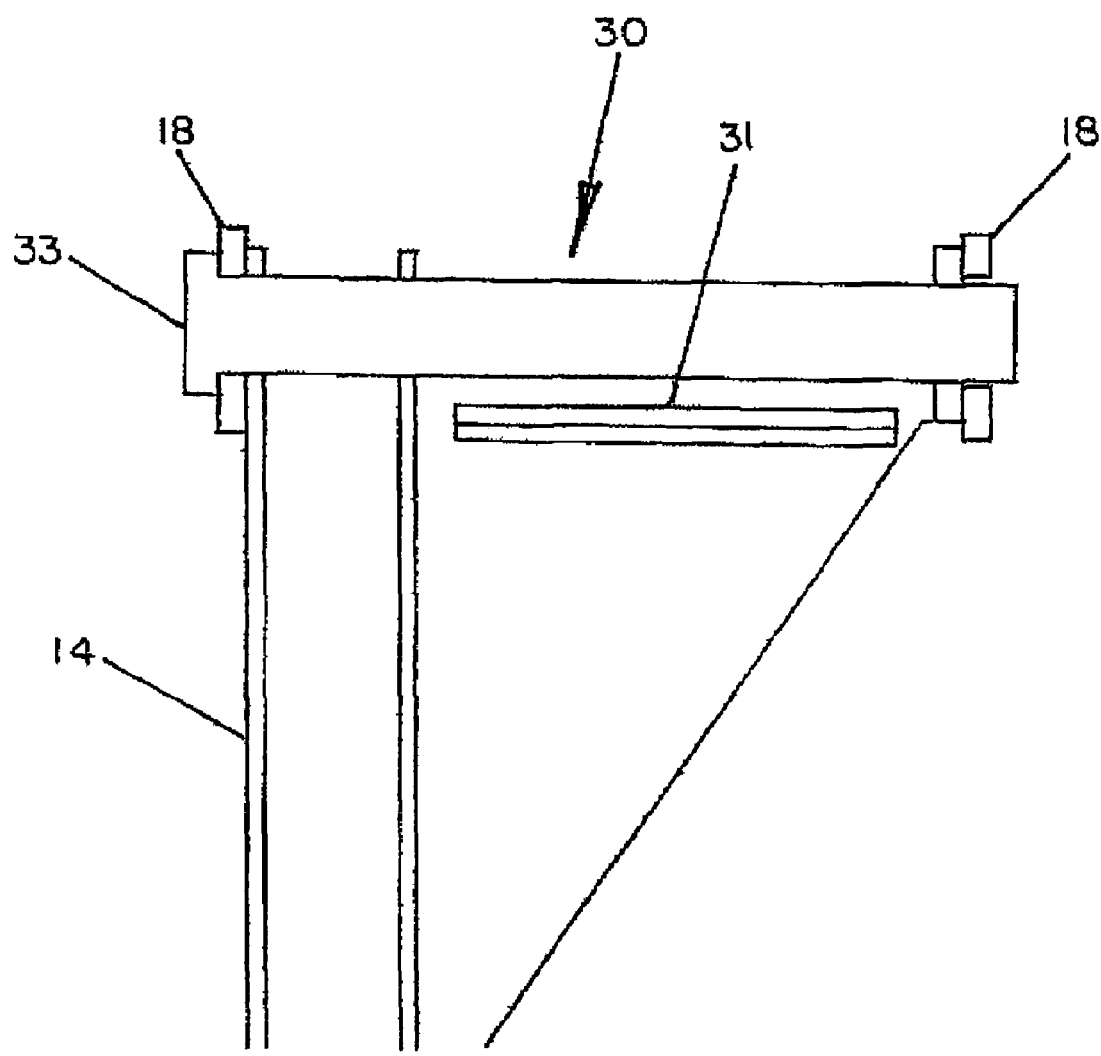
FIG. 8 is a sectioned view taken along line B-B of FIG. 2.

Hinge point 30 is a mechanism connecting support arm 14 with sliding member 18. Hinge point 30 may in a like manner be any suitable hinge known in the art, and may also be fashioned such that it limits the extent to which support arm 14 may swing. One exemplary design for a suitable hinge is illustrated in FIG. 5. The hinge design shown in FIG. 5 includes stop feature 31, which is part of sliding member 18, having components of stop features 31a and 31b. Sliding member 18 positively positions support arm 14 and sliding member 18 in substantially a horizontal (31a) and a perpendicular (31b) orientation. Stated another way, stop feature 31b facilitates secure positioning of support arm 14 in its unfolded, use position. In a preferred embodiment, stop feature 31 comprises substantially flat perpendicular (31b) and horizontal (31a) faces. The faces 31a and 31b are part of sliding member 18 that support arm 14 in its respective use and storage positions. Hinge 30 is illustrated in FIG. 5 substantially as it would appear when support arm 14 is in its down, unfolded position, ready for user access. Stop feature 32, being a part of the end piece of support arm 14, is received by stop feature 31a in its folded, stored position. When a user wishes to swing support arm 14 to its use position, substantially perpendicular to sliding member 18, support arm 14 is rotated about an axle (33) integral with hinge 30. When apparatus 10 is positioned in its use position, face 31b abuts against a flat surface of support arm 14. A partial cross section of hinge 30 is illustrated in FIG. 8.

In a preferred embodiment, sliding member 18 is substantially rectangular and slides within guide rail bracket 16, which is preferably fashioned such that sliding member 18 is positively retained within guide rail bracket 16 (or the "C" shaped component if applicable). Guide rail bracket 16 may be fabricated as three individual components or fabricated as one "C" shaped component.

Figure 6:
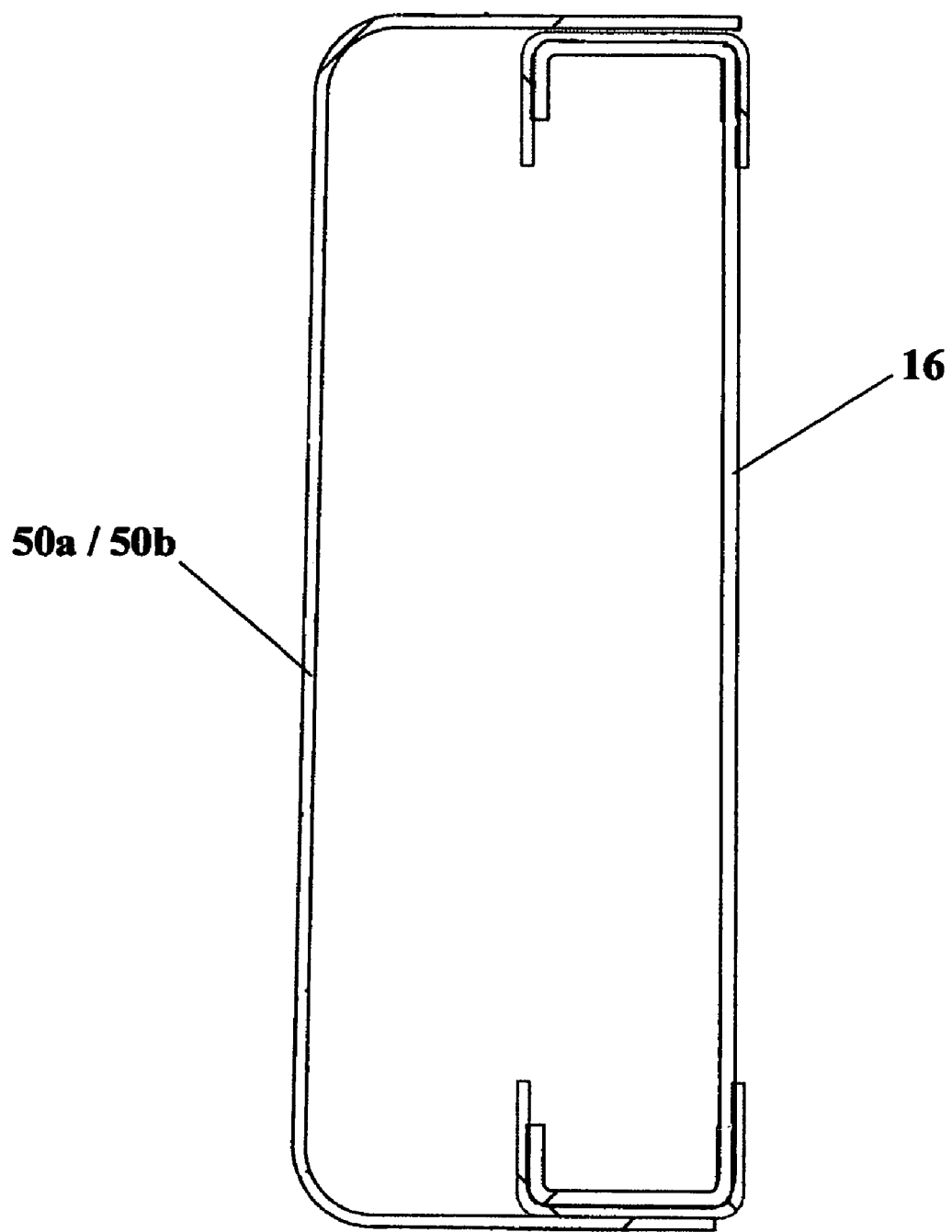
FIG. 6 is a partial sectioned view taken along line A-A of FIG. 2.

Guide rail 16 defines an inwardly opening channel that retains the edges of sliding member 18. A pair of support members 50a and 50b are preferably provided, and assist in retaining guide rail 16 within the interior of the vehicle tailgate. In a preferred embodiment, support or spacing members 50a and 50b are substantially "C"—shaped and support guide rail 16. This preferred design and configuration is illustrated in FIG. 6. Those skilled in the art, however, will appreciate that the disclosed design of spacing members 50a and 50b might be varied without departing from the scope of the present invention. Moreover, they might be dispensed with altogether, it is merely desirable to provide a means for securing apparatus 10 within the interior of the vehicle tailgate. Spacing members 50a and 50b will vary based upon the particular design of the particular vehicle's tailgate by the auto manufacturer, however, the function and utility will remain the same.

Guide rail 16 is affixed to face plate 40. Face plate 40 is affixed to the side of the vehicle tailgate. The design of face plate 40 may vary based upon the particular design of the particular vehicle's tailgate by the auto manufacturer, however, the function and utility will remain the same.

Face plate 40 is preferably provided, and assists in attaching apparatus 10 to the vehicle tailgate. In a preferred embodiment, face plate 40 is circumferential of apparatus 10, near hinge point 30, and sized sufficiently large that it can readily accommodate the folded, sliding apparatus when moved between an extended, use position and a retracted, stowed position.

In a preferred embodiment, apparatus 10 is housed within the interior of the vehicle tailgate, however, alternative embodiments are contemplated (not shown) wherein it is attached to an exterior of the tailgate. In a typical after market installation process, holes will be cut into the interior face (top side of tailgate in down position) and side of the tailgate sufficient to allow for installation of the step apparatus 10. Apparatus 10 may need to be modified based upon the particular design of the vehicle's tailgate, to allow for aftermarket installation.

Because guide rail bracket 16 is attached internally of the vehicle tailgate, the entire apparatus in a stowed position is virtually invisible. Preferably only lifting plate cover 22 is visible from the exterior of the vehicle. When use of apparatus 10 is desired, a user can pull upwardly/outwardly on lift plate cover 22 to extend the device. This step can take place when the vehicle tailgate is in the open, down position only. Sliding member 18 slides along guide rail 16, and is preferably extended to its maximum distance, to approximately face plate 40. Once hinge point 30 clears face plate 40, support arm 14 can be folded perpendicular to guide rail 16. Foot plate 12 is then preferably folded to its down position perpendicular to support arm 14, and the device is ready for use.

Figure 9:
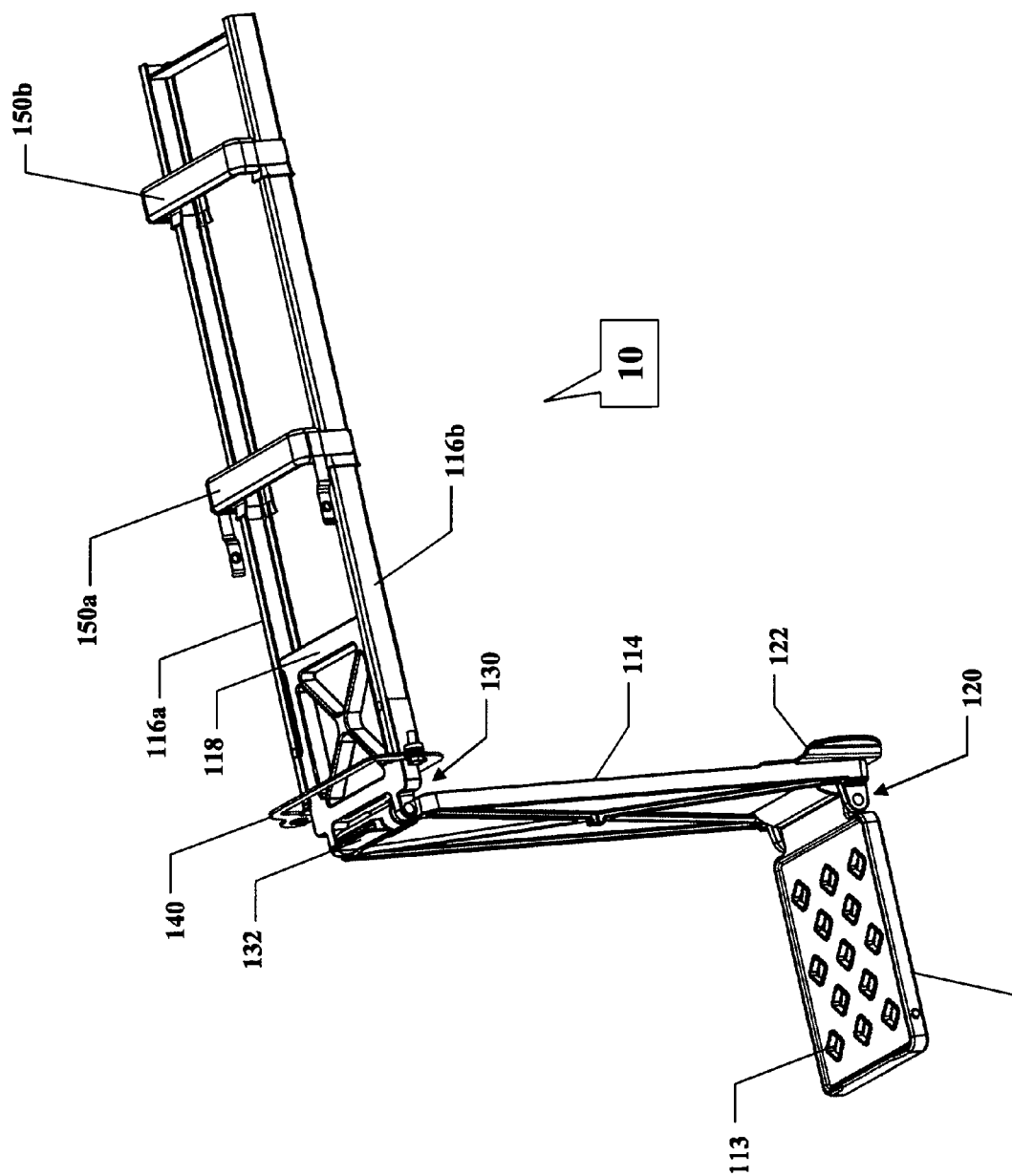
FIG. 9 is a perspective view of an alternate embodiment of a step apparatus according to the present invention.

FIG. 9 shows an alternate embodiment of a step apparatus according to the present invention. Like numerals indicate like parts. The apparatus 110 includes a step plate 112 pivotally connected to a support arm 114. Support arm 114 is pivotally connected to sliding member 118. Sliding member 118 is slideable between a pair of rails 116a and 116b. The apparatus 110 operates in generally the same manner as described above for apparatus 10.

The present description is for illustrative purposes only, and should not be construed to narrow the breadth of the present invention in any way. Thus, those skilled in the art will appreciate that various modifications might be made to the presently disclosed embodiments without departing from the intended spirit and scope of the present invention. Other aspects, features and advantages will become apparent upon an examination of the attached drawings Figures.

What is claimed is:

1. A tailgate step for use on a vehicle, said step including:
   a guide rail bracket;
   a sliding member arranged within said guide rail bracket;
   a support arm pivotally connected to an end of said sliding member, said support arm capable of adjusting to a plurality of predetermined lengths;
   a stop arranged at an end of said sliding member;
   a face plate secured to said guide rail bracket;
   a step plate pivotally connected to said support arm;
   a cover secured to an end of said support arm; and
   a seat member arranged between said support arm and said cover, said step plate engages said seat member when said step plate is in a position for use.

2. The step of claim 1 wherein said support arm includes a stop plate arranged at or near an end of said support arm.

3. The step of claim 2 wherein said stop plate having a flange, said stop plate having a generally triangular shape.

4. The step of claim 1 wherein said step plate is positioned substantially 90° relative to said support arm.

5. The step of claim 1 wherein said support arm having a first and second member, said second member slidingly arranged within said first member, said first and second members include reciprocal locking members to secure said members to each other.

6. The step of claim 1 wherein said support arm is substantially perpendicular to said guide rail bracket in a use position and said support arm is substantially parallel to and arranged within said guide rail bracket in a storage or nonuse position.

7. The step of claim 1 wherein said support arm having a generally square cross section.

8. The step of claim 1 further including a first and second support member.

9. The step of claim 1 wherein said guide rail bracket generally having a "C" shape.

10. The step of claim 1 wherein said guide rail bracket having a cut out arranged on one side at one end of said guide rail bracket.

11. The step of claim 10 wherein said cut out will allow said step plate to be inserted within said guide rail bracket when the step is in a storage position.

12. The step of claim 1 wherein said sliding member is positively locked to said guide rail bracket when the step is in a use position.

13. The step of claim 1 wherein said sliding member generally has a "U" shape.

14. The step of claim 1 wherein said sliding member having a flange extending from an end thereof.

15. The step of claim 14 further including a pin contacting said flange and said support arm at said pivot point.

16. A tailgate step for use on a vehicle, said step including:
a guide rail bracket;
a sliding member arranged within said guide rail bracket;
a support arm pivotally connected to an end of said sliding member;
a stop arranged at an end of said sliding member;
a face plate secured to said guide rail bracket;
a step plate pivotally connected to said support arm;
a cover secured to an end of said support arm, said cover having a lock, said lock secures the tailgate step in a stored position within the tailgate.

17. The step of claim 16 wherein said cover having a generally rectangular shape.

18. A truck tailgate step mounted substantially internally and partially externally in a tailgate, said step including:
a guide rail bracket;
a sliding member slidingly arranged within said guide rail bracket;
a plurality of support members connected to said guide rail bracket;
a support arm having a stop plate, said support arm pivotally connected to said sliding member;
a step plate pivotally connected to said support arm;
a stop arranged at an end of said sliding member;
a face plate secured to said guide rail bracket;
a support member connected to said support arm;
a cover secured to an end of said support arm; and
a seat member arranged between said support arm and said cover, said step plate engages said seat member in a folded down use position.

* * * * *

UNITED STATES PATENT AND TRADEMARK OFFICE
CERTIFICATE OF CORRECTION

| | |
|---|---|
| PATENT NO. | : 7,264,253 B1 |
| APPLICATION NO. | : 11/064632 |
| DATED | : September 4, 2007 |
| INVENTOR(S) | : Robert Cummings |

It is certified that error appears in the above-identified patent and that said Letters Patent is hereby corrected as shown below:

Col. 1, Line 18 - Please replace "transmit" with --transit -- after "conventional automobile"

Signed and Sealed this

Twenty-seventh Day of November, 2007

JON W. DUDAS
*Director of the United States Patent and Trademark Office*